Figure 1:
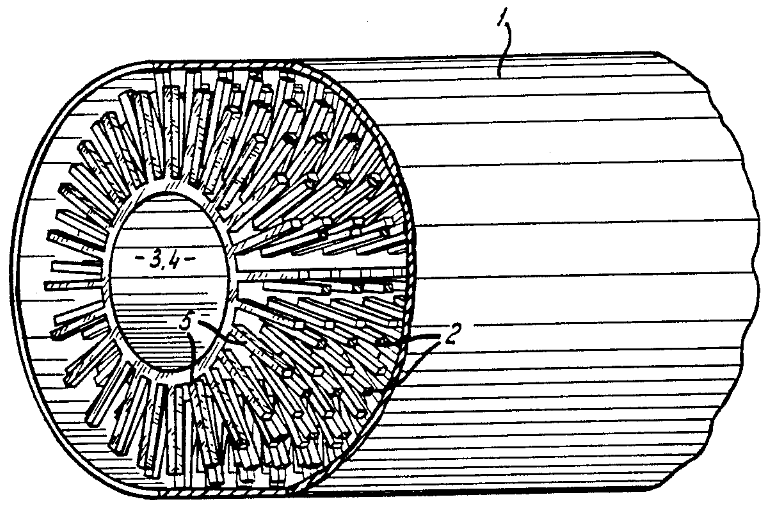

United States Patent [19]
Koenraads et al.

[11] Patent Number: 4,980,179
[45] Date of Patent: Dec. 25, 1990

[54] METHOD FOR REGULATING THE STRUCTURE OF FAT-CONTAINING FRESH CHEESE PREPARED BY ULTRAFILTRATION

[75] Inventors: Jacobus P. J. M. Koenraads, Gouda; Geradus J. J. Broekman; Herman E. Haak, both of Montfoort, all of Netherlands

[73] Assignee: Melkunie Holland B.V., Woerden, Netherlands

[21] Appl. No.: 213,531

[22] Filed: Jun. 30, 1988

[30] Foreign Application Priority Data

Jul. 3, 1987 [NL] Netherlands ........................ 8701574

[51] Int. Cl.[5] ........................................ A23C 19/00
[52] U.S. Cl. ........................................ 426/36; 426/40; 426/39; 426/582; 426/491; 426/495
[58] Field of Search ........................ 426/40, 36, 38, 39, 426/582, 491, 492, 495

[56] References Cited

FOREIGN PATENT DOCUMENTS 2232999 6/1973 France .
2128464 10/1983 United Kingdom .
2182539 10/1986 United Kingdom .

OTHER PUBLICATIONS

"Einsatz des Spezialmembran-Systeme zur Herstellung von Speisequark und anderen Frischkasesorten," Deutsch Molkerei-Zeitung, vol. 106, No. 36, pp. 1180, 1181, 1192-1194 and 1199 (1985).

"Produktion von Thermo-Quark mit der Neuen UF--Gechnologie," Deutsche Milchwirtschaft, vol. 35, pp. 1790-1795 (1984).

*Primary Examiner*—Marianne Cintins
*Attorney, Agent, or Firm*—Webb, Burden, Ziesenheim & Webb

[57] ABSTRACT

A method for regulating the structure of fat-containing fresh cheese by ultrafiltration from milk having a percentage of fat in the dry milk solids of more than 0.5% to which, after pasteurization, followed by cooling and adjustment to incubation temperature, a starter culture and rennet are added, followed by a biological acidification at the standard temperature to a pH of at most 4.6, optional thermization at 55° to 60° C., cooling again to ultrafiltration temperature, subjection of the mass obtained to ultrafiltration, mixing of the retentate with the standard additives, and processing the retentate with the additives further by intensive mixing at a temperature of at most 65° C.

4 Claims, 1 Drawing Sheet

1
2
3,4
5

METHOD FOR REGULATING THE STRUCTURE OF FAT-CONTAINING FRESH CHEESE PREPARED BY ULTRAFILTRATION

The invention relates to a method for regulating the structure of fat-containing fresh cheese prepared by ultrafiltration from milk to which, after pasteurization, followed by cooling and adjustment to incubation temperature, a starter culture and rennet are added, followed by a biological acidification at the standard temperature to a pH of at most 4.6, optional thermization at 55° to 60° C., cooling again to ultrafiltration temperature, subjecting the mass obtained to an ultrafiltration and mixing of the retentate with standard additives.

Such a method is known from Deutsche Milchwirtschaft 1790–1795 (1984).

In that case, the procedure is as follows: skimmed milk having a solids content of 8.8–9.2 % by weight is heated for 5 minutes at 95° C. After 0.5 % by weight of starter culture has been added at 27° C., pre-ripening takes place for two hours to a pH of 6.55. Then 0.75 ml of rennet is added per 100 kg of milk and the latter is curdled. After 15 to 17 h, a pH value of 4.6 is reached and the curds are thermized for 3 minutes at 59° C. and then cooled down again to 39° C. At this temperature, ultrafiltration is carried out to obtain a solids content of 17 to 18% by weight in the retentate. The retentate is cooled to 10° C., mixed with cream (35–50 % by weight fat), curds or fruits, buffered and packaged. In this process, therefore, the entire quantity of cream needed for establishing the required percentage of fat in the dry milk constituents is added to the retentate of the ultrafiltration.

In copying this scheme it has been found that the product thus obtained differs in a clearly negative manner in a number of aspects from fresh cheese which is prepared in the traditional manner, such as that which is described, for example, in "Cheese and Fermented Milk Foods" by Frank Kosikowski, pages 144–168 (1978). Since the traditional method in which curd cheese, cream, sugar, fruits and herbs are mixed has the drawback relatively large quantities of fat and protein are lost from the product in the preparation of the curd cheese, as a result of which the yield is obviously unnecessarily reduced, it is of importance to attempt to carry out the preparation of fresh cheese using ultrafiltration because with this procedure the fat and protein losses could be markedly lower.

The fresh cheese which is prepared by the abovementioned method with the aid of ultrafiltration has too limp a structure and will liquify very quickly.

From the article by G. Herbertz entitled "Einsatz des Spezialmembran-Systeme zur Herstellung von Speisequark und anderen Frischkäsesorten" ("Use of Special Membrane Systems for the Preparation of Edible Curd Cheese and Other Types of Fresh Cheese") in Deutsche Molkerei-Zeitung, vol. 106, no. 36, September 1985, in particular pages 1180, 1181, 1192–1194, a similar method is known in which it is once again additionally emphasized that it is of decisive importance to heat the milk to 95° C. and to maintain said temperature for 5 minutes. Then, and only then, is a fresh cheese with a sufficiently stiff structure obtained. According to said publication, any change in the time/temperature relationship results in an impairment of the structure of the fresh cheese.

French Patent No. 2,232,999 also teaches a method for preparing a fresh cheese. In Example 1, a skimmed-milk cheese is prepared, and in Example 2, a cheese is obtained having a fat content in the solid of almost 40%. On copying it has been found that both types of cheese have an unsatisfactory structure because the fat content is too low in the first example and the fat content is only adjusted in the second example after concentration has already been carried out.

It was found now that these drawbacks can be eliminated and that an approx. 20% higher yield compared with the traditional method can be achieved by adjusting the required percentage of fat in the dry milk constituents by adjusting the fat content of the original milk to more than 0.5 % by weight and processing the retentate with the additives further by intensive mixing at a temperature of at most 65° C., while the mixing temperature can be set 0.05° -5° C. lower for each 0.1 % by weight the fat contentof the original milk exceeds 0.5 % by weight.

Preferably the optionally homogenized, pasteurized product is allowed to acidify to pH =4.50, it is allowed to thermize for 3 minutes at 56° C., cooled down to 38° C. and is then subject to ultrafiltration.

Preferably, the retentate is also further subjected, optionally after adding thickening agents, salts, flavouring and aromatic substances, to a homogenization.

In a further preferred embodiment, the retentate isolated in the ultrafiltration is mixed not only with molasses, flavourings and aromatic substances, but, if required, also additionally with the remaining quantity of cream, and then mixing is carried out extremely carefully in a mixing device which is provided with rapidly rotating cog wheels.

In a preferred embodiment, all the cream required is added to the original milk. This is, for example, desirable in the preparation of fresh cream cheese. However, it is then absolutely necessary to homogenize the mixture. Were this to be omitted, then the separation of moisture (syneresis) would occur in the final product and a less stiff structure would be formed.

In the preparation of fresh cheese in which, in additionto the milk constituents, sugar, fruit and herbs are also processed, the constituents mentioned should be added to the retentate obtained in the ultrafiltration and should be mixed in an extremely intensive manner.

Of the intensively operating mixing devices, such as a static mixer, a scraped heat exchanger, a centrifugal pump, a homogenizer, and a dynamic mixer, a mixer equipped with beating pins is the most suitable.

Figure 2:
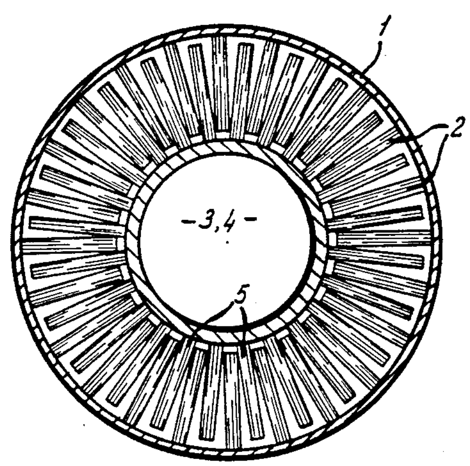

An example of such a rapidly rotating mixer with pin wheels is shown diagrammatically in FIGS. 1 and 2.

FIG. 1 shows such a device in perspective. It consists of a hollow cylinder (1) on which there are pins (2) directed towards the longitudinal axis (3) on the inside. The longitudinal axis (3) coincides with the axis of a rotatable rotor (4) with pins (5) which are fitted from the longitudinal axis in the direction of the cylinder wall. The mixing head comprises more than 1400 pins.

FIG. 2 represents a cross-section of such a device in which the reference symbols have the same meaning as in FIG. 1. The pins preferably have a thickness of 7.6×7.6 mm but they may vary from 6×6 to 8×8 mm.

The temperature at which the mixing in such a mixing device with pin wheels is carried out is of great importance. The closer the operating temperature is to 65° C., the stiffer the structure of the product obtained becomes so that lower values are found on measuring with a penetrometer. This reduction of the penetrometer values is accompanied by the product becoming somewhat grainy (cheese-like).

The closer the operating temperature is to a lower temperature than 65° C., the less stiff the structure becomes and the penetrometer penetrates deeper into the product.

At a certain mixing temperature, the stiffness increases, the greater the proportion of cream which is already added to the original milk.

Fresh cheese prepared with the aid of ultrafiltration of homogenized soured milk with a fat content of 3.5% yields a comparable product to a fresh cheese prepared according to the known method.

As the mixing intensity, expressed in the number of revolutions of the pin wheels per unit time, becomes greater, the stiffness of the product increases. This effect is greater, the higher the mixing temperature is.

The residence time in the mixer is not of critical importance.

The use of UHT milk rather than normally treated pasteurized milk appears not to have any disadvantageous effect on the stiffness of the product.

Sugar is added as syrup in which the colouring agents and flavourings are dissolved and which is, if necessary, mixed with cream.

Molasses may, for example, be prepared by heating 10 parts by weight of water to 80° C., dissolving 20 parts by weight of sugar therein, pasteurizing the mixture for 5 mi at 80° C. and subsequently cooling.

EXAMPLE I

Fresh cheese with additives is prepared by mixing retentate, obtained in ultrafiltration, of acidulated milk, and a mixture of cream, sugar, water, colouring agents and flavourings.

To prepare the product, 100 parts by weight of skimmed milk (fat content 0.05 % by weight) was used as the starting point. These were pasteurized at 92° C. for 6 minutes and then cooled to 26° C. Subsequently, 0.01 parts by weight of concentrated deepfrozen starter was added and 1.5 hours thereafter, 0.001 parts by weight of rennet. When a pH of 4.5 was reached, the gel formed was smoothly stirred and thermized for 3 minutes at 56° C., after which cooling was carried out to 38° C. At this temperature, the soured thermized milk was subjected to an ultrafiltration in which 75 parts by weight of permeate and 25 parts by weight of retentate with a solids content of 18.2% by weight and a protein content of 13.5% by weight were obtained. The retentate was cooled in a tubular cooler to 10° C. and stored in a buffer vessel in which stirring was slowly carried out with a gate stirrer.

The 25 parts by weight of retentate were mixed with 15.3 parts by weight of a mixture consisting of 3.8 parts by weight of water, 4.5 parts by weight of sugar, 7 parts by weight of cream with a fat content of 49.9 % by weight and the required aromatic and colouring agents. The mixing was carried out, inter alia, with a static mixer of the Kenics type, followed by a pin wheel mill of the Oakes type. The feed capacity was 36 kg/h and the rotary speed was 2430 revolutions per minute.

The filling temperature was 19° C.

The final product had a penetrometer value of 298 (which is a penetration depth of 29.8 mm) at a measuring temperature of 7° C. The product was rated organolepticcally as much too limp and liquified very rapidly.

A product according to the invention was prepared by starting from 100 parts by weight of standardized milk which contained 1.5 parts by weight of milk fat. This was homogenized at 10 MPa and 65° C. and then pasteurized for 6 minutes at 92° C. After cooling to 26° C., 0.01 part by weight of concentrated deep-frozen starter was added and 1.5 hours later, 0.001 part by weight of rennet. On reaching a pH of 4.5, a gel was smoothly stirred and thermized for 3 minutes at 56° C. and then cooled to 38° C. At this temperature, the soured thermized milk was subjected to ultrafiltration to produce 70 parts by weight of permeate and 30 parts by weight of retentate with a solids content of 22.0 % by weight and a protein content of 11.8% by weight. The retentate was collected in a buffer vat in which stirring was slowly carried out with a gate stirrer.

The 30 parts by weight of retentate were mixed with 12.2 parts by weight of a mixture consisting of 4.5 parts by weight of sugar, 2.3 parts by weight of water, 5.4 parts by weight of cream which contained 2.1 parts by weight of milk fat, and the required colouring and aromatic substances. The mixing was carried out with a static mixer of the Kenics type, followed by a pin wheel mill of the Oakes type. The feed capacity was 31 kg/h and the rotary speed was 2430 revolutions per minute. The mixing temperature was 54° C. The final product had a penetrometer value of 160 (which is a penetration depth of 16 mn) at a measuring temperature of 7° C. and had a good structure and a good "mouth feel".

EXAMPLE II

Fresh cheese containing additives was prepared by mixing retentate and a mixture of cream, sugar, water, and colouring and aromatic substances in a manner such that the fat content in the final product was 8.8% by weight.

The fresh cheese was prepared by starting from skimmed milk (0.05% fat) or standardized milk containing 0.5, 1.0, 1.5 and 3.5 % fat. After treating these milk variants as stated for preparing the product according to the invention in Example I, the various retentates were mixed with such a quantity of sugar, water and cream that the same end product composition was obtained in all cases (8.8% by weight fat, 7.8% by weight protein and 13.5% by weight sugar in the solids).

The mixing was carried out with a static mixer of the Kenics type, followed by a pin wheel mill of the Oakes type. The feed capacity was approx. 30 kg/h and the rotary speed was 2430 revolutions per minute. The temperature at which mixing was carried out varied from 36° to 65° C.

The results of the stiffness measurements are shown in the table below.

TABLE

Results of stiffness measurements on fresh cheese containing additives (penetrometer values expressed in units of 0.1 mm penetration depth)

| % fat in original milk | Mixing temperature | | | |
|---|---|---|---|---|
| | 36–37° C. | 43–47° C. | 53–57° C. | 63–65° C. |
| 0,05% | 360 | 297 | 210 | 173 |
| 0,5% | 360 | 278 | 192 | 171 |
| 1% | 280 | 236 | 190 | 169 |
| 1,5 | — | 202 | 160* | — |
| 3,5 | 188 | 128* | — | — |

Penetrometer values of 160 and less correspond to an organoleptically satisfactory, stiff product which is comparable to the stiffness of a product of the same composition prepared in the traditional manner.

The variants with the penetrometer values provided with an asterisk (*) meet this requirement.

EXAMPLE III

Fresh cream cheese is prepared in the traditional manner by heating up milk standardized to 10.4% by weight fat to 55° C. and homogenizing to 11 MPa. A holding pasteurization is then carried out at 73° C. for 30 minutes, followed by cooling to 32° C. After adding starter culture, rennet and CaC12, curdling is carried out for 2 hours while stirring. The curds/whey mass is now transferred to linen bags, after which the whey is drained through the meshes in the bags. The drained curds are then mixed with thickening agents and salt, heated up to 78° C. and homogenized at 10 MPa, packaged hot and cooled.

Fresh cream cheese prepared by the method of the invention was homogenized with standardized milk having a fat content varying from 10.4 to 10.8% by weight to 5 or 10 MPa respectively, flowpasteurized at 80° or 95° C. respectively for 5 minutes and cooled to 23° C. After inoculation with 2 % by weight starting culture, pre-acidification was carried out for approx. 2 hours, after which 10 mg of rennet per kg of milk were added. Further acidification was then carried out for 16 hours until the pH was 4.5.

After smooth stirring the gel, the thermization was carried out for 3 minutes at 56° C., followed by ultrafiltration to obtain a solids content in the retentate of 46% by weight and a fat content of 32.5% by weight. The retentate was homogenized after heating to 78° C. at 10 MPa and then packaged and cooled. The fresh cream cheese prepared by ultrafiltration is comparable in all respects with cream cheese prepared in the traditional manner.

The novel preparation process differs from the traditional process in that the fat and protein losses which are high during drainage in linen sacks no longer occur and in that, in addition, the whey proteins are included in the cream cheese. In relation to the structure of the final product, CaC12 no longer has to be added to the cheese milk in the method according to the invention and moisture separation in the final product is prevented with a relatively low homogenization pressure in the standardized milk, ie. 5 MPa instead of 11 MPa in the traditional preparation.

We claim:

1. In a method for regulating the structure of fat-containing fresh cheese comprising the steps of pasteurizing, cooling and adjusting to incubation temperature a quantity of milk, treating said milk by adding to it a starter culture and rennet, conducting acidification, thermization, ultrafiltration and mixing of the treated milk with a quantity of cream and sugar, the improvement comprising adjusting the fat content of the quantity of milk to more than 0.5% by weight and processing the product which results after ultrafiltration by mixing it with the intensity needed to produce a stiff product at a temperature of 65° C. maximum.

2. Method according to claim 1, wherein acidification proceeds to pH =4.5 and cooling subsequent to thermization for 3 minutes at 56° C. proceeds down to 38° C.

3. Method according to claim 1, wherein after mixing intensive homogenization is effected.

4. Method according to claim 1, wherein the product resulting from ultrafiltration is further treated by mixing with it a quantity of one or more additives selected from the group consisting of molasses, flavoring, aromatic substances and cream in a mixing device which is provided with rapidly rotating pin wheels.

* * * * *